United States Patent [19]
Koeth et al.

[11] 4,158,232
[45] Jun. 12, 1979

[54] ADAPTIVE CORRECTOR

[75] Inventors: Helmut Koeth, Münich; Gero Schollmeier, Gauting, both of Fed. Rep. of Germany

[73] Assignee: Siemens Aktiengesellschaft, Berlin & Münich, Fed. Rep. of Germany

[21] Appl. No.: 863,518

[22] Filed: Dec. 22, 1977

[30] Foreign Application Priority Data
Jan. 28, 1977 [DE] Fed. Rep. of Germany ....... 2703622

[51] Int. Cl.² .......................... G06F 15/34; H04B 1/10
[52] U.S. Cl. ...................................... 364/724; 325/42; 333/18
[58] Field of Search .................... 364/724; 325/41, 42; 333/18, 28 R, 70 T

[56] References Cited
U.S. PATENT DOCUMENTS

| 3,665,394 | 5/1972 | Lender et al. | 325/41 X |
| 3,694,752 | 9/1972 | Gibson | 333/18 X |
| 3,787,762 | 1/1974 | Sato | 325/42 |
| 3,969,674 | 7/1976 | Tracey | 364/724 X |

FOREIGN PATENT DOCUMENTS 1444824  8/1976  United Kingdom .................. 325/329

Primary Examiner—Jerry Smith
Attorney, Agent, or Firm—Hill, Van Santen, Steadman, Chiara & Simpson

[57] ABSTRACT

An adaptive or self-adjusting corrector is provided for the correction or equalization of data signals formed with the primary value and a plurality of prior and subsequent oscillations. A plurality of delay members are provided for delaying the data signals. Members for multiplying the data signals by alterable coefficients are provided at outputs of each of the delay members. At least one adder connects with the coefficient members for summing up the multiplied data signals. Either a first coefficient member corresponding to the primary value of the data signal or a second coefficient member corresponding to a first subsequent oscillation of the data signal establish constant coefficients. Alternatively both the first and second coefficients may be made constant. Preferably the constant value is zero.

5 Claims, 3 Drawing Figures

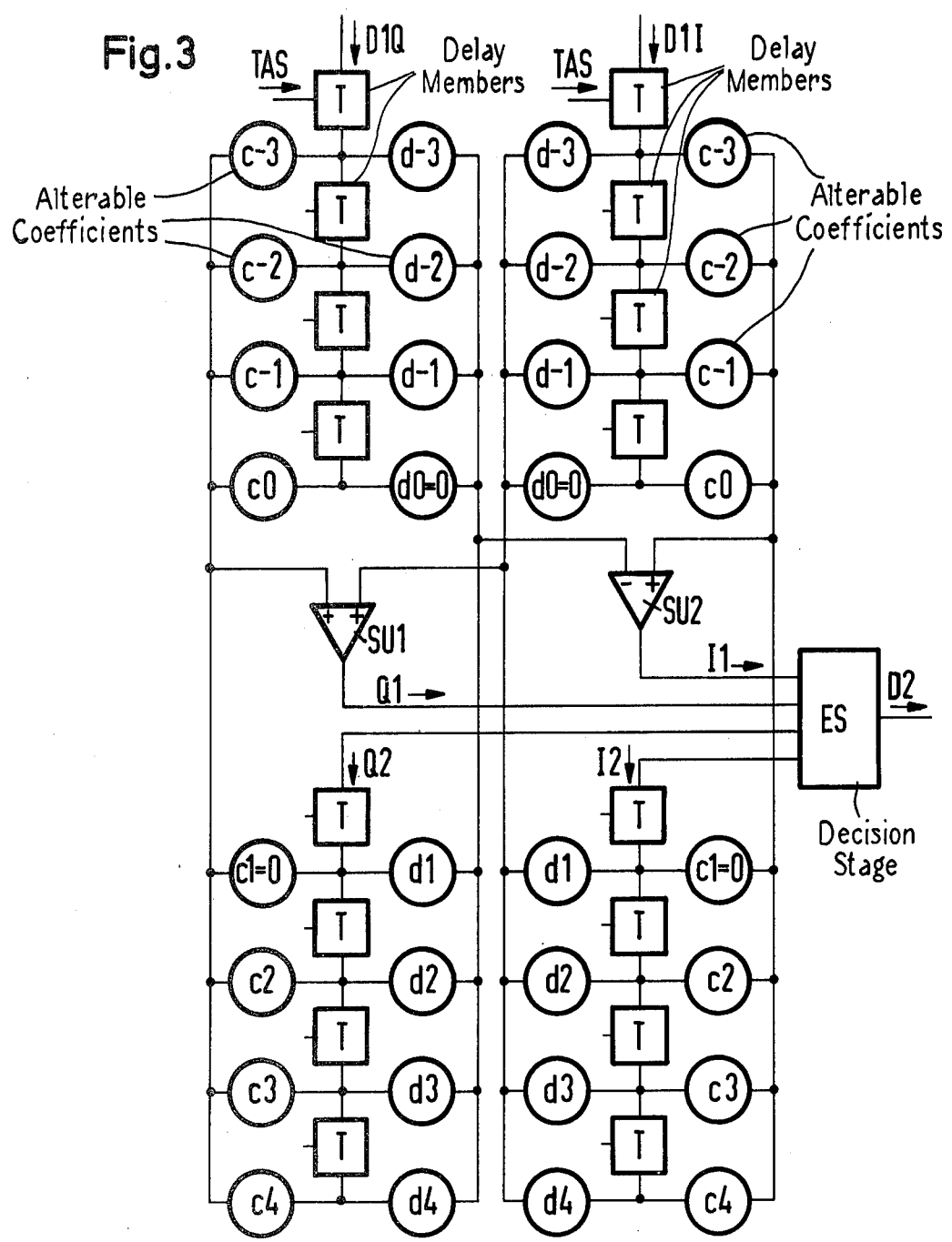

ADAPTIVE CORRECTOR

BACKGROUND OF THE INVENTION

The invention relates to an adaptive corrector or equalizer for correcting or equalizing data signals which are respectively formed as a primary value and a plurality of prior and subsequent oscillations, and wherein the plurality of delay members which delay the data signals are provided. The signals are multiplied with alterable coefficients at the outputs of the delay members. At least one analog adder is provided which sums up the signals multiplied by the coefficients.

It is already known to use adaptive, i.e. automatically self-adjusting equalizers or correctors for the correction of the time characteristic of data signals. Such correctors are switched on in a data receiver following a demodulator for the data signals, but prior to a scanning stage and prior to a decoder. A particular advantage of the adaptive correctors is that they automatically adjust to the respective transmission channel properties at the beginning of a data transmission and that they can also control or regulate alterations of these properties during a transmission. Most of the adaptive correctors presently known are constructed of so-called echo correctors or transversal filters for a synchronous data transmission via band restricted transmission paths. A transversal filter consists of a delay line with taps spaced in correspondence with a time span which is assigned to the delay between two subsequent transmitted steps. An adjusting member is connected to each tap of the delay line which can exhibit an alterable amplification. The sum of the partial voltages, evaluated by coefficients appears at the output of the transversal filter. In the adaptive correctors or equalizers, the coefficients are altered for a sufficient length of time until a receiver impulse has the best possible form.

Pulse and carrier signals are synchronized in the data receiver during a transmission with the aid of the data signals received. The carrier signals are required for the demodulation of the data signals, and the pulse signals are required for the scanning of the data signals.

Interferring couplings between the adjustment of the coefficients and the pulse or carrier control or regulation can occur with the utilization of an adaptive corrector together with the pulse and carrier phase control or regulation stages.

SUMMARY OF THE INVENTION

The invention therefore has the underlying objective to disclose an improved adaptive corrector in which a coupling or interaction between the automatic adjustment of the coefficients of the adaptive corrector and the regulation or control stages for a pulse and carrier signal control is prevented in a simple manner.

The objective is inventively resolved in the adaptive corrector or equalizer of the invention in that the coefficient assigned to the primary value of the data signals and/or the coefficient assigned to the first subsequent oscillation in accordance with the primary value, has a constant value.

The circuit arrangement in accordance with the present invention has the advantage that an interferring coupling between the adjustment of the coefficients of the adaptive corrector and the regulation or control of the pulse and carrier signals is avoided without any additional expense. The adaptive corrector in accordance with the present invention can then be particularly employed in an advantageous manner when decision feedback pulse and carrier signal controls or regulations are provided.

Experiments have shown that it is particularly of advantage when the coefficient assigned to the primary value of the data signals and/or the coefficient assigned to the first subsequent oscillation in accordance with the primary value, have the value of 0.

BRIEF DESCRIPTION OF THE DRAWINGS

FIG. 3 illustrates a block circuit diagram of an adaptive corrector.

DESCRIPTION OF THE PREFERRED EMBODIMENTS

Figure 1:
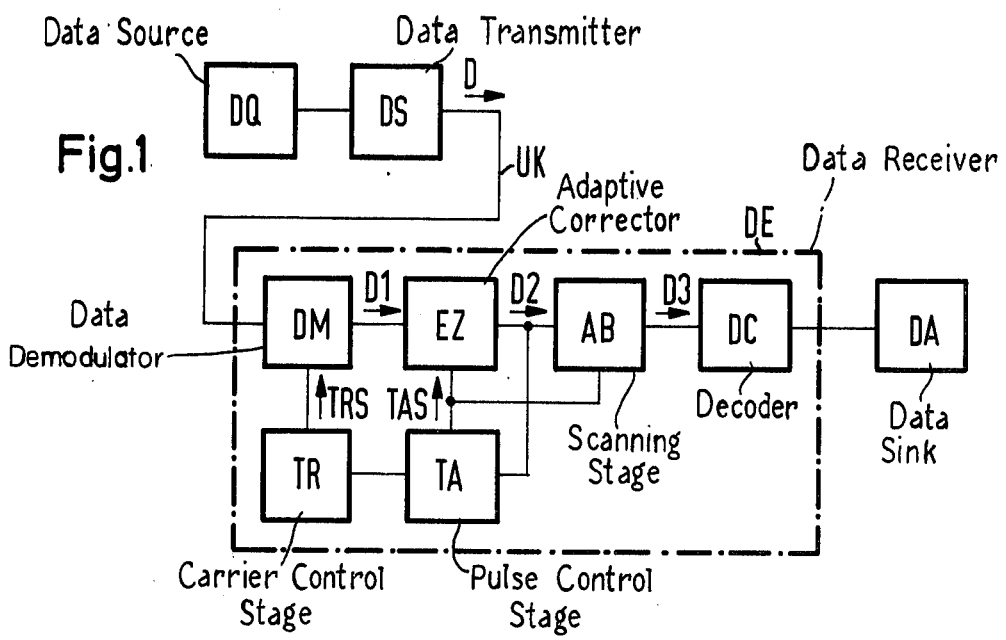
FIG. 1 illustrates a block circuit diagram of a data transmission arrangement.

In the data transmission arrangement illustrated in FIG. 1, a data source DQ gives data to a data transmitter DS. The data transmitter DS produces modulated data signals D corresponding to the data, and transmits said data signals to a data receiver DE via a transmission channel UK. The data receiver DE contains a modulator DM to which the data signals D are conveyed and which provides the demodulated data signals D1 to a corrector EZ. The corrector EZ, which is constructed as an adaptive or self-adjusting corrector or equalizer provides corrected data signals D2 to a scanning stage AB which produces scanned data signals D3 with the aid of pulse or timing signals TAS. The data signals D3 are connected to a decoder DC which recovers the transmitted data and provides them to a data sink or load DA.

The data receiver DE contains a pulse regulation stage TA to which the corrected data signals D2 connect and which produces the timing pulses TAS. The timing pulses TAS for their part connect to a scanning stage AB and can also be conveyed to the corrector EZ if said corrector is constructed of delay members which are formed of shift registers. The data receiver DE furthermore contains a carrier regulation or control stage TR providing carrier signals TRS to the demodulator DM in order to produce the demodulated data signals D1 from the transmitted data signals D. The production of the timing pulses TAS and of the carrier signals TRS in a data receiver DE is already generally known and described, for example, in German Offenlegungsschrift No. 2,257,288.

The corrector EZ as other known transversal filters, consists of a plurality of delay members at whose outputs signals are provided which are multiplied by alterable coefficients and which are conveyed to one or several adders. The corrected signals are given off at the outputs of the adders. The coefficients in such an adaptive corrector are altered such that the corrected data signal D2 has the best possible form.

With the simultaneous utilization of an adaptive corrector and of decision back-coupled pulse and carrier signal regulations, however, interfering couplings between the adjustment of the coefficients of the adaptive corrector and the pulse and carrier signal regulations can occur. Therefore, particular measures in order to prevent such couplings are taken in the adaptive corrector EZ.

Figure 2:
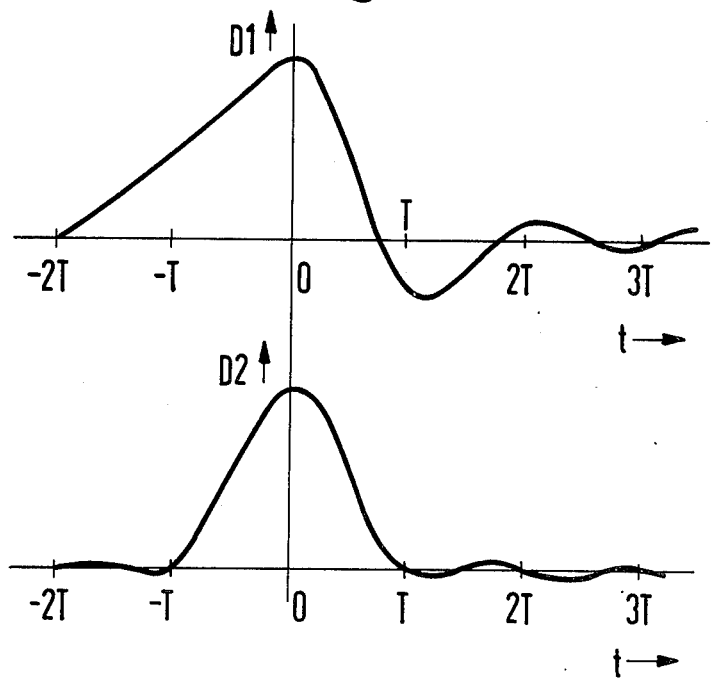
FIG. 2 shows a signal image of data signals.

In the time diagrams of demodulated data signals D1 and corrected data signals D2 illustrated in FIG. 2, the time t is plotted in the direction of the abscissa and the instantaneous values of the data signals are plotted in the direction of the ordinate. The demodulated data signal D1 assumes its primary value at time O. After it falls below the zero line before time T, it exhibits a plurality of subsequent oscillations. In order to produce a corrected data signal D2 in correspondence with FIG. 2 from the demodulated data signal D1, the coefficients with the aid of which the signals are multiplied at the taps of the delay members in the adaptive corrector EZ are adjusted such that the demodulated data signal D2 respectively exhibits the value of O at points of time −2T, −T, T, 2T and 3T and that it exhibits the primary value at time O.

FIG. 3 illustrates a block circuit diagram of an adaptive corrector EZ for amplitude and phase modulated data signals. The corrector EZ exhibits a plurality of delay members having a delay time T. Demodulated data signals D1I or D1Q are conveyed to a first portion of the delay members as they are provided, for example, at the output of a demodulator DM which multiplies transmitted data signals with two carrier signals TRS which are orthogonal in relation to one another. The signals at the outputs of the delay members are multiplied by alterable coefficients d-3 through dO or c-3 through cO. With the aid of two adders SU1 or SU2, the multiplied signals are compounded in a suitable manner. Signals Q1 or I1 are provided at the outputs of the adders SU1 or SU2 to a decision stage ES. The decision stage ES provides data signals Q2 or I2 to an additonal number of delay members. The signals are again multiplied by coefficients c1 through c4 or d1 through d4 at the outputs of these delay members and are also suitably conveyed to the adders SU1 and SU2. The corrected data signal D2 is provided at the output of the decision stage ES. If the delay members having the delay time T are fashioned as shift registers, it is expedient to also convey the timing pulses TAS provided by the pulse regulator stage TA to the shift registers.

Experiments have shown that it is expedient not to alter the coefficient dO, corresponding to the primary value of the data signal D1, in order to decouple the regulator or control unit TR of the carrier signal phase from the adaptive corrector EZ. It has been proven particularly advantageous to set this coefficient to O. If a correction stage for the correction of the demodulated data signals D1 is provided instead of a regulation stage TR for the regulation of the carrier signal phase such as described, for example, in the German patent application No. P 26 23 749.0, it has also been proven advantageous to set the coefficient dO to the value of O. It is therefore particularly advantageous not to alter the coefficient dO of the orthogonal channel when the demodulated data signals D1I and D1Q are used. Rather it is advantageous to keep the coefficient fixed at the value of O.

In order to decouple the adaptive corrector EZ from the regulation stage TA in order to regulate the timing pulse TAS it has also been proven advantageous not to alter the coefficient c1 corresponding to the first subsequent oscillation in accordance with the main value. It is particularly advantageous if this coefficient is also held at O. This decoupling is, for example, then particularly effective when the value of c1 of the in-phase channel is not altered in a two-channel adaptive corrector and when the first zero transit of the data signal D1 in accordance with primary value is utilized for the regulation of the timing pulses TAS. The regulation stage TA for the regulation of the timing pulses TAS is described, for example, in the German patent application No. P 26 32 165.3.

For the shaping perfection of the adaptive corrector EZ, it is expedient to digitally store the values of the coefficients c or d and to always take care that the value of 0 for the coefficients c1 and/or dO always remains in the storage locations. A simultaneous storing of the values of O in the storage locations is not absolutely necessary for the coefficients c1 and dO, as both measures can be used independently from one another for the decoupling.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. An adaptive corrector for the correction of data signals formed as a primary value and a plurality of prior and subsequent oscillations, comprising: a plurality of delay means for delaying the data signals; means for multiplying the data signals by coefficients at outputs of the delay means; at least one adder means for summing up the multiplied data signals; means for setting a first coefficient corresponding to said primary value of the data signals and for setting a second coefficient corresponding to a first subsequent oscillation of the data signal, and said means for setting providing a constant value for at least one of said first and second coefficients; and means for altering all remaining coefficients.

2. The corrector of claim 1 in which one of the first and second coefficients are assigned to O.

3. The corrector of claim 2 in which both first and second coefficients are assigned to O.

4. The corrector of claim 1 in which both the first and second coefficients have a constant value.

5. An adaptive corrector for the correction of received data signals formed as a primary value and a plurality of prior and subsequent oscillations, comprising: a plurality of delay means for delaying the data signals; coefficient means connected at outputs of a plurality of said delay means for multiplying the data signals by coefficients; at least one adder means connected to a plurality of said coefficient means for summing up multiplied data signals; said coefficients including two main value coefficients and two first subsequent oscillation coefficients; said coefficient means including means for maintaining at least one of the main value coefficients and one of the subsequent oscillation coefficients constant and means for altering the other main value coefficient and the other first subsequent oscillation coefficient.

* * * * *